(12) United States Patent
Garcia, Jr. et al.

(10) Patent No.: US 7,191,899 B2
(45) Date of Patent: Mar. 20, 2007

(54) DISC CARTRIDGE STORAGE CASE HAVING PRESENTATION STAND

(75) Inventors: Jose Pascual Garcia, Jr., Terre Haute, IN (US); Michael John Brown, Terre Haute, IN (US)

(73) Assignees: Sony Corporation, Tokyo (JP); Sony Electronics Inc. NJ (US)

( * ) Notice: Subject to any disclaimer, the term of this patent is extended or adjusted under 35 U.S.C. 154(b) by 139 days.

(21) Appl. No.: 10/813,044

(22) Filed: Mar. 31, 2004

(65) Prior Publication Data

US 2005/0218016 A1    Oct. 6, 2005

Related U.S. Application Data

(60) Provisional application No. 60/530,070, filed on Dec. 15, 2003.

(51) Int. Cl.
*B65D 85/57* (2006.01)
*A47G 29/00* (2006.01)

(52) U.S. Cl. ............... 206/308.1; 206/308.3; 211/40

(58) Field of Classification Search ............ 206/308.1, 206/308.3, 307, 309, 459.5; 211/40, 41.18
See application file for complete search history.

(56) References Cited

U.S. PATENT DOCUMENTS

| | | | |
|---|---|---|---|
| 219,563 A | 9/1879 | Allen | |
| 1,129,346 A | 2/1915 | Goldsmith | |
| 1,377,120 A | 5/1921 | Exline | |
| 1,868,029 A | 7/1932 | Steinthal | |
| 4,598,822 A | 7/1986 | Hemmings | |
| 4,778,047 A | 10/1988 | Lay | |
| 4,823,950 A | 4/1989 | Roze | |
| 4,844,260 A | 7/1989 | Jaw | |
| 4,884,691 A * | 12/1989 | Behrens et al. | 206/308.3 |
| 5,176,250 A | 1/1993 | Cheng | |
| 5,293,995 A | 3/1994 | Iwaki et al. | |
| 5,443,159 A | 8/1995 | Cheng | |
| 5,477,960 A * | 12/1995 | Chen | 206/308.1 |
| 5,531,322 A | 7/1996 | Iwaki et al. | |
| 5,597,068 A | 1/1997 | Weisburn et al. | |

(Continued)

FOREIGN PATENT DOCUMENTS

EP            0289698 A2    11/1988

(Continued)

*Primary Examiner*—Bryon P. Gehman
(74) *Attorney, Agent, or Firm*—Rader, Fishman & Grauer PLLC; Ronald P. Kananen

(57) ABSTRACT

A disc cartridge storage case has a clam-shell type construction with front and back panels and a middle panel connected between the front and back panels by integral hinges. The front and back panels are pivotable relative to the middle panel between respective open and closed positions. A holder is provided on the middle panel for holding a disc cartridge perpendicular to the middle panel. The holder has a rigid support and a flexible support with a slot therebetween for receiving the disc cartridge. Pins with beveled ends are provided on the flexible support and extend into the slot for engaging corresponding holes in the disc cartridge. The flexible support allows the pins to be flexed outwardly away from the first rigid support to facilitate inserting and removing the disc cartridge from the slot. The back panel prevents the flexible support from flexing outward when the case is closed.

32 Claims, 5 Drawing Sheets

U.S. PATENT DOCUMENTS

| | | |
|---|---|---|
| 5,749,464 A | 5/1998 | Cheris et al. |
| 5,845,771 A | 12/1998 | Fu |
| 5,865,310 A | 2/1999 | Lee |
| 5,931,296 A * | 8/1999 | Kobayashi et al. ...... 206/308.3 |
| 5,971,144 A | 10/1999 | Heiligers |
| 6,024,215 A | 2/2000 | Leung |
| 6,029,811 A * | 2/2000 | Heiligers ................. 206/308.1 |
| 6,199,689 B1 | 3/2001 | Higuchi et al. |
| 6,263,642 B1 | 7/2001 | Heiligers |
| 6,283,284 B1 | 9/2001 | Crane et al. |
| 6,371,300 B1 | 4/2002 | Uchida |
| 6,435,344 B2 * | 8/2002 | Lin ......................... 206/308.3 |
| 6,554,132 B2 | 4/2003 | Lau |
| 2001/0035367 A1 | 11/2001 | Cliff et al. |
| 2002/0014421 A1 | 2/2002 | Byrne et al. |
| 2003/0052022 A1 | 3/2003 | Tempongko |
| 2003/0080006 A1 | 5/2003 | Ku |
| 2003/0150754 A1 | 8/2003 | Saw |
| 2004/0026275 A1 * | 2/2004 | Margetts et al. ......... 206/308.1 |

FOREIGN PATENT DOCUMENTS

| | | |
|---|---|---|
| GB | 2154550 A * | 9/1985 |
| GB | 2266707 A | 11/1993 |
| GB | 2274450 A | 7/1994 |

* cited by examiner

DISC CARTRIDGE STORAGE CASE HAVING PRESENTATION STAND

This application claims the benefit of U.S. Provisional Application No. 60/530,070 filed on Dec. 15, 2003.

BACKGROUND OF THE INVENTION

1. Field of the Invention

The present invention relates to holders and storage containers for information carriers, such as disc cartridges and the like. More specifically, the present invention relates to a presentation stand for holding a disc cartridge, and a storage case having the presentation stand on a middle panel thereof for presenting the disc cartridge to the user when the case is opened.

2. Description of the Related Art

Many types of data storage media are well known in the art, including compact discs (CDs), DVDs, floppy discs, and so forth. Additional types of data storage media are scheduled for launch into the market in the near future. Among these new data storage media is the Universal Media Disc (UMD), which is a 60 mm optical media disc accommodated in a disc cartridge. The UMD cartridge has two blind holes on the back (lower shell) that are used for alignment in the UMD player. The present invention was developed to provide a suitable storage case and presentation stand for this new UMD cartridge.

The prior art includes many containers developed for CDs and the like. For example, U.S. Pat. Nos. 6,263,642 and 5,971,144 issued to Heiligers discloses a container having a holder on the middle panel of a three-panel clam-shell type container for holding a CD. The holder has clamping elements disposed on each side of a slot for receiving and clamping the outer perimeter edge of the CD. However, Heiligers' container is not designed to accommodate the new UMD cartridge, and particularly does not include a structure that would engage the blind holes on the back of the UMD cartridge.

The prior art also includes many containers developed for floppy discs and the like. For example, U.S. Pat. No. 5,293,995 issued to Iwaki et al. discloses a holder on the middle panel of a three-panel clam-shell type storage case for holding a floppy disc. Additional floppy discs are held against the inner surfaces of the front and back panels. The holder includes a semi-circular projection on a bottom surface thereof, which is engageable with a similarly shaped recess in the edge of the floppy disc for alignment purposes. The semi-circular projection extends in the direction of insertion of the floppy disc into the holder, and therefore does not aid in the retention of the floppy disc within the holder. Spaced apart ribs also extend into the opening of the holder of Iwaki et al. to define limited zones for frictionally gripping the floppy disc.

Other prior art containers have been developed for holding multiple CDs or floppy discs. For example, U.S. Pat. No. 6,199,689 issued to Higuchi et al. discloses a container for holding a plurality of floppy discs using cartridge-gripping structures formed on the middle panel of the container. U.S. Pat. No. 5,477,960 issued to Chen and U.S. Pat. No. 6,024,215 issued to Leung disclose storage cases in which multiple CDs can be stored.

While the prior art storage cases described above are presumably suitable for their intended purposes, they do not provide an acceptable structure for use with UMD cartridges and other storage media as contemplated by the present inventors. Thus, there is a need in the industry for an improved disc cartridge storage case.

SUMMARY OF THE INVENTION

It is an object of the present invention to provide an improved disc cartridge storage case that solves the problems and shortcomings with the prior art devices described above.

It is a further object of the present invention to provide a disc cartridge storage case that holds a cartridge securely in place when the case is closed during assembly, packaging, distribution, selling, and consumer use.

It is a further object of the present invention to provide a disc cartridge storage case that uses positioning holes on the cartridge to secure the cartridge within the case.

It is a further object of the present invention to provide a disc cartridge storage case that has a presentation stand feature for presenting the product to the user when the case is opened.

It is a further object of the present invention to provide a disc cartridge storage case that is economical to manufacture and assemble, that is easy to use, that has a durable construction for portable use, that provides additional security for the retail industry, that provides a place for displaying graphics and instructional material, and that provides a low-cost and effective solution for storing UMD cartridges and similar data recording media.

To achieve the stated and other objects, the present invention may be embodied as a disc cartridge storage case having a clam-shell type construction with front and back panels and a middle panel connected between the front and back panels by integral hinges. The front and back panels are pivotable relative to the middle panel between respective open and closed positions. A holder is provided on the middle panel for holding a disc cartridge perpendicular to the middle panel. The holder has a rigid support and a flexible support with a slot therebetween for receiving the disc cartridge. Pins with beveled ends are provided on the flexible support and extend into the slot for engaging corresponding holes in the disc cartridge. The flexible support allows the pins to be flexed outwardly away from the first rigid support to facilitate inserting and removing the disc cartridge from the slot. The back panel of the case prevents the flexible support from flexing outward when the case is closed.

According to a broad aspect of the present invention, a storage case is provided comprising: a first cover portion; an intermediate portion connected to the first cover portion by a first hinge; a second cover portion connected to the intermediate portion by a second hinge, the first and second cover portions each being pivotable relative to the intermediate portion between respective open and closed positions; and the intermediate portion is provided with a holder for a disc cartridge. The holder has a slot, and the case has at least one projection extending into the slot for engaging a corresponding hole in a cartridge for holding the cartridge in the slot.

According to another broad aspect of the present invention, a cartridge and a cartridge storage case are provided in combination. The cartridge has a housing with at least one hole formed therein. The cartridge storage case comprises: a front panel; a middle panel connected to the front panel by a first hinge; a back panel connected to the middle panel by a second hinge, the front and back panels each being pivotable relative to the middle panel between respective open and closed positions; and a holder provided on the middle panel for holding the cartridge. The holder has a slot into which the cartridge is insertable, and the case has at least one projection extending resiliently into the slot for engaging the hole in the cartridge for holding the cartridge within the slot.

According to another broad aspect of the present invention, a disc cartridge presentation stand is provided, comprising: a holder for holding a cartridge, the holder having a slot into which the cartridge can be inserted, and at least one projection extending resiliently into the slot for engaging a corresponding recess in the cartridge for holding the cartridge within the slot.

Numerous other objects of the present invention will be apparent to those skilled in this art from the following description wherein there is shown and described a preferred embodiment of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A storage case 10 for disc cartridges according to a first embodiment of the present invention will now be explained with reference to FIGS. 1 to 11 of the drawings.

The disc cartridge storage case 10 according to the first embodiment of the present invention has a clam-shell type construction. The case 10 is preferably constructed as a single molded piece using an injection molding process with a suitable plastic, such as polypropylene, that provides a clear or opaque container structure. The case 10 includes a first cover portion 11, an intermediate portion 12, and a second cover portion 13.

Figure 1:
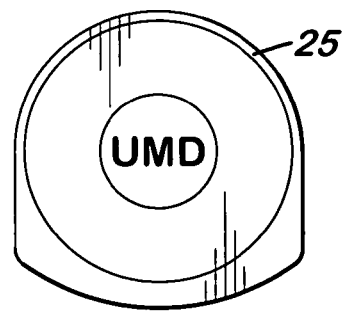
FIG. 1 is a front view of a UMD disc cartridge to be used with the storage case of the present invention.
Figure 2:
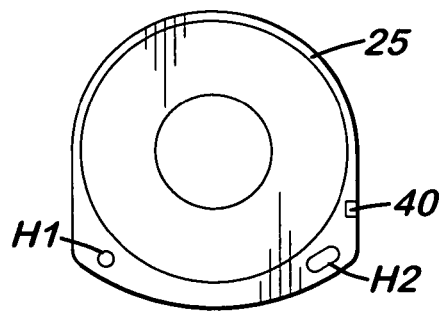
FIG. 2 is a rear view of the UMD disc cartridge shown in FIG. 1.
Figure 3:
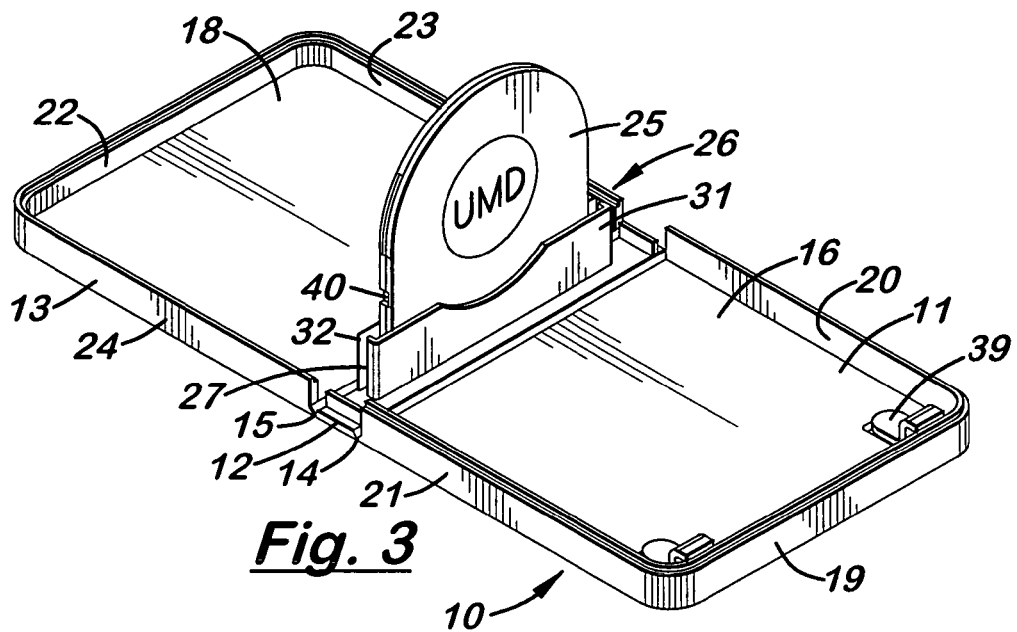
FIG. 3 is a perspective view of a storage case in an open condition according to a first embodiment of the present invention.
Figure 4:
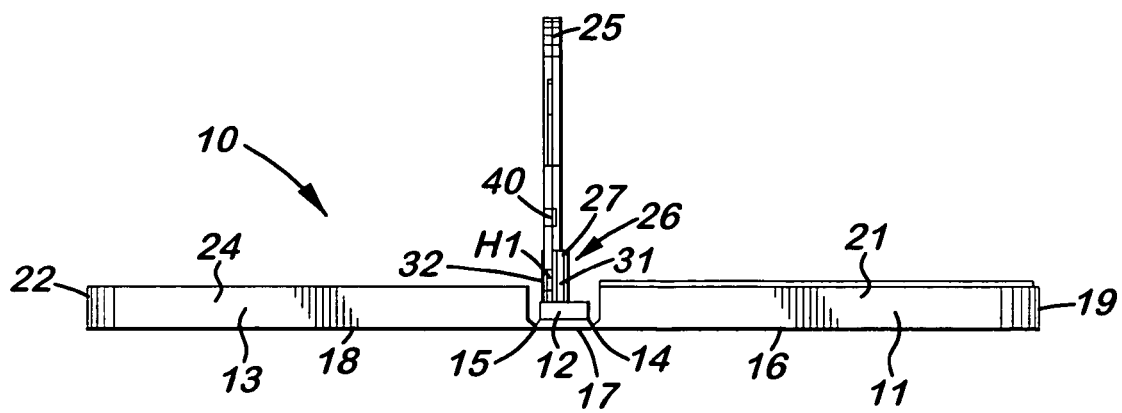
FIG. 4 is a side view of the storage case in the open condition shown in FIG. 1, according to the first embodiment.
Figure 5:
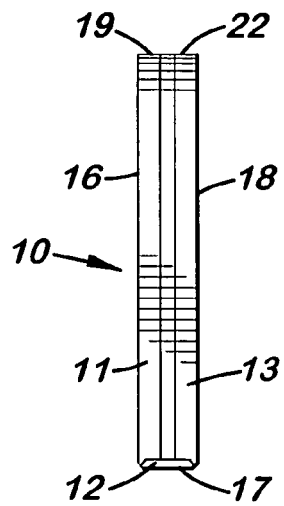
FIG. 5 is a side view of the storage case in a closed condition, according to the first embodiment.
Figure 6:
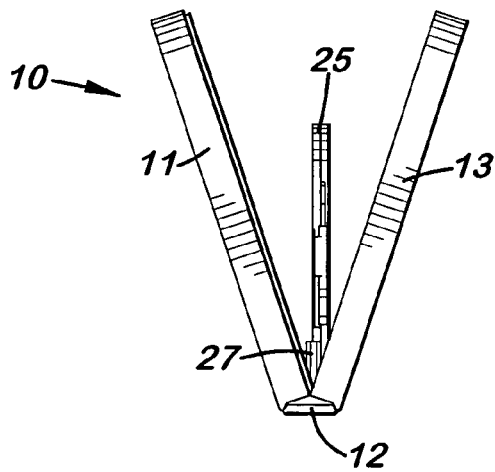
FIG. 6 is a side view of the storage case according to the first embodiment, showing a condition in which the case is beginning to open.

The first cover portion 11 and the second cover portion 13 are connected to the intermediate portion 12 by two integral hinges 14, 15. The hinges 14, 15 have V-shaped grooves that provide a relatively thin deforming element at the junctures between the first and second cover portions 11, 13 and the intermediate portion 12. The hinges 14, 15 are located near the outer surface of the container so that the first and second cover portions 11, 13 are pivotable about an angle of at least 90 degrees relative to the intermediate portion 12. The first and second cover portions 11, 13 can be pivoted from an open position, as shown in FIGS. 3 and 4, to a closed position, as shown in FIG. 5. In the open position, the planar surfaces 16, 17, 18 of the first and second cover portions 11, 13 and the intermediate portion 12 are substantially flat and coplanar with each other. In the closed position, the first and second cover portions 11, 13 are perpendicular to the intermediate portion 12.

The first cover portion 11, which is also referred to herein as the front panel, has a planar surface 16, a front wall 19 along its longitudinal edge opposite the hinge 14, and sidewalls 20, 21 that extend along the lateral edges of the planar surface 16.

The second cover portion 13, which is also referred to herein as the back panel, has a planar surface 18, a front wall 22 along its longitudinal edge opposite the hinge 15, and sidewalls 23, 24 that extend along the lateral edges of the planar surface 18. The sidewalls 23, 24 and front wall 22 of the second cover portion 13 overlap with the sidewalls 20, 21 and front wall 19 of the first cover portion 11 when the first and second cover portions 11, 13 are in their closed positions. The intermediate portion 12 defines another wall of the case 10 when the first and second cover portions 11, 13 are in their closed positions, thereby making the closed storage case 10 substantially impervious to water and dust.

When the case 10 is closed, the first and second cover portions 11, 13 and the intermediate portion 12 close forming a U-shaped cross-section in which the intermediate portion 12 is perpendicular to the first and second cover portions 11, 13. The case 10 is opened by pulling the first and second cover portions 11, 13 outward, similar to opening a book. As this occurs, both panels 11, 13 rotate in opposite directions around the integral hinges 14, 15 at each side of the middle panel 12.

The storage case 10 of the present invention has been developed to accommodate a disc cartridge 25 known as the Universal Media Disc ("UMD") cartridge, and to hold such cartridge 25 in place during a normal assembly, packaging, distribution, and consumer use environment. The UMD cartridge 25 is designed to accommodate a 60 mm optical media disc. However, the storage case 10 of the present invention can be enlarged or reduced to accommodate similar cartridges in other applications.

The storage case 10 has a presentation stand 26 for holding the disc cartridge 25. The presentation stand 26 is formed by a holder 27 on the intermediate portion 12 of the case 10. The holder 27 can be formed integral with the intermediate portion 12, or it can be formed as a separate component that is secured to the intermediate portion 12, for example, by welding or adhesive. The holder 27 has a slot 28 defined between facing surfaces 29, 30 of a first rigid support 31 and a second flexible support 32. The slot 28 is constructed so that it opens in a direction perpendicular to the planar surface 17 of the intermediate portion 12, and holds the disc cartridge 25 with the cartridge oriented in a plane perpendicular to the planar surface 17 of the intermediate portion 12.

The disc cartridge 25 has at least one positioning hole, and preferably a plurality of holes (e.g., blind holes), formed therein. In the UMD cartridge 25, two blind holes H1, H2 are incorporated on the backside (lower shell) of the cartridge 25. The two holes H1, H2 are arranged to reduce the location accuracy required of the playing hardware (i.e., the player). One of the holes H1 is round to provide movement control along the horizontal (x) axis and the vertical (y) axis. The other hole H2 is elongated along the x-axis and serves only to prevent the cartridge 25 from rotating around the cross-directional (z) axis.

The holder 27 has at least one projection 34, and preferably two projections 34, 35 that extend into the slot 28 to engage and maintain the disc cartridge 25 within the slot 28. The projections 34, 35 of the holder 27 are arranged to correspond in location with the holes H1, H2 in the disc cartridge 25 so that the projections 34, 35 can be inserted resiliently into the holes H1, H2 of the disc cartridge 25. A first one of the projections 34 is inserted into the round hole H1 of the cartridge 25 to hold the cartridge in place and keep it from moving in the x and y direction. A second one of the projections 35 is inserted into the elongated second hole H2 of the cartridge 25 to keep the cartridge from rotation around the z-axis. This allows manufacturing variation within the case 10 without creating a fit problem. It also makes the process of inserting the cartridge 25 into the holder 27 more robust as perfect alignment between the case 10 and the cartridge 25 is not necessary. A tolerant insertion accommodation is critical for automated assembly and during manual insertion, especially by children.

In the preferred embodiment, the projections 34, 35 are pins that are formed integrally with the flexible support 32 of the holder 27. The pins 34, 35 each extend from a flap-shaped cutout portion 36 of the flexible support 32 that allows the pins 34, 35 to flex resiliently within the slot 28 and away from the rigid support 31. The pins 34, 35 each have a beveled end 37 positioned within the slot 28 to facilitate insertion and removal of the cartridge 25 from the slot 28.

The holding action of the holder 27 is engaged by sliding the cartridge 25, with the larger diameter edge leading, into the holder 27. The beveled ends 37 of the pins 34, 35 provide a lead-in for the cartridge 25 and cause the flexible support 32 to flex outward to allow the cartridge 25 to slip into position within the slot 28. This causes the pins 34, 35 to exert force on the cartridge 25 as the flexible support 32 tries to return to its position of equilibrium.

Tapered guides 38 are provided on each side of the opening of the slot 28. The tapered guides 38 provide a tolerant lead-in to help self-align the cartridge 25 during insertion into the slot 28. This self-alignment also helps to align the cartridge holes H1, H2 with the pins 34, 35 of the holder 27. As the cartridge 25 is moved into position and the pins 34, 35 become aligned with the holes H1, H2, the pins 34, 35 snap into the holes H1, H2 and hold the cartridge 25 in place.

When the case 10 is open, the holder 27 holds the cartridge 25 in place with sufficient pressure and engagement to hold it in position within the slot 28. However, the pressure is low enough to make removal and insertion of the cartridge 25 easy. With the case 10 open and the cartridge 25 held in place, it is easy to remove the cartridge 25 simply by applying a slight amount of linear or torsional force to overcome the force of the flexible support 32 and disengage the pins 34, 35. When such a force is applied, the flexible support 32 flexes away from the rigid support 31, and the pins 34, 35 move outward. This disengages the pins 34, 35 from the holes H1, H2 and allows the cartridge 25 to be removed from the case 10.

Figure 7:
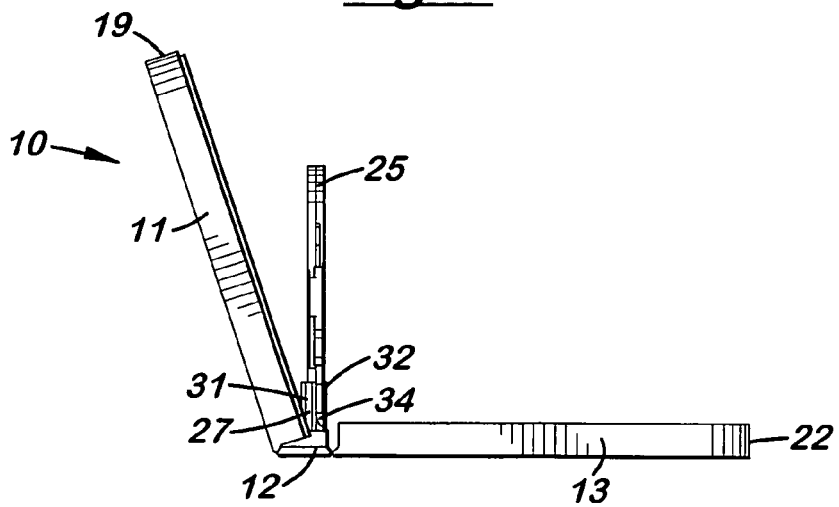
FIG. 7 is a side view of the storage case according to the first embodiment, showing the back panel of the storage case in a fully open position and the front panel of the case in a partially open position, and showing the holder in partial section.
Figure 8:
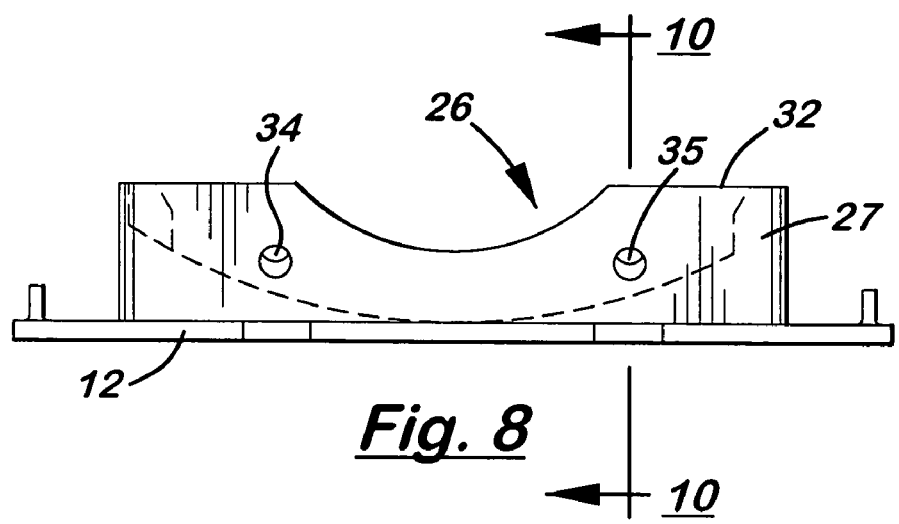
FIG. 8 is a front view of the holder attached to the middle panel of the storage case of the present invention.
Figure 9:
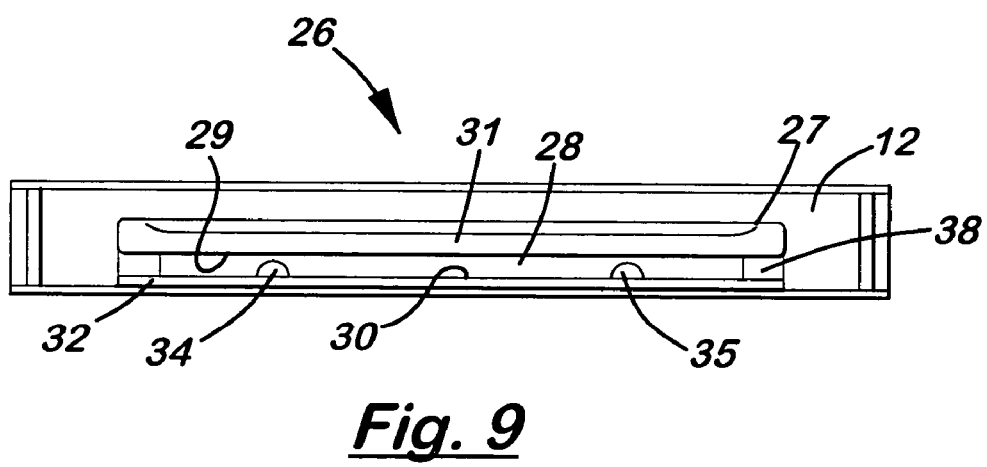
FIG. 9 is a plan view of the holder shown in FIG. 8.
Figure 10:
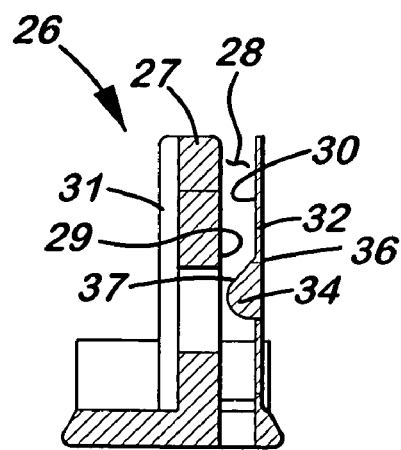
FIG. 10 is a cross section view of the holder, as viewed along line 10—10 in FIG. 8.
Figure 11:
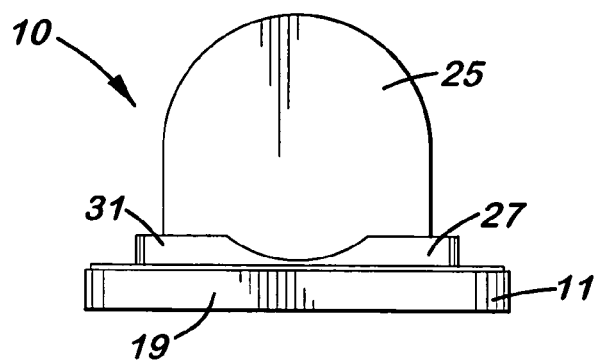
FIG. 11 is an end view of the storage case in the open condition according to the first embodiment.

As shown, for example, in FIGS. 4 and 7, the holder 27 is positioned slightly off-center on the intermediate portion 12, toward the second cover portion 13. This provides room for graphics and/or printed instructional material (not shown) to be inserted under the clips 39 on the inside of the first cover portion 11. It also brings the flexible support 32 of the holder 27 closer to the second cover portion 13 of the case 10.

The above-described construction of the case 10 provides a built-in security feature that holds the cartridge 25 securely within the holder 27 and enables the cartridge 25 to withstand the assembly, packaging, distribution, and consumer environment when the case 10 is closed. The security feature is provided by the flexible support 32 of the holder 27 being engaged by the second cover portion 13 of the case 10 when the case is closed. When the case 10 is closed, the flexible support 32 is captured by the second cover portion 13 and prevented from flexing outward. Since the flexible support 32 cannot flex outward when the case 10 is closed, the holding pins 34, 35 remain engaged with the blind holes H1, H2 of the cartridge 25, and the cartridge 25 remains in place within the slot 28. Thus, the holder 27 improves the theft resistance of the case 10 because it requires the case 10 to be opened prior to removal of the cartridge 25.

Other security features can also be built into the cartridge 25 and/or the case 10. For example, holes (not shown) can be provided in the holder 27 in line with holes (e.g., blind holes) in the back of the cartridge when the cartridge 25 is seated in the holder 27. Pins or other suitable projections (not shown) can then be incorporated on the back panel 13 of the case 10 that would align themselves with the holes in the holder 27 as the case 10 is closed. These pins would protrude through the holder 27 and engage the blind holes on the back of the cartridge 25, thereby keeping the cartridge 25 in place within the holder 27 when the case 10 is closed.

Alternatively, the cartridge can be clipped from the side by engaging a slot 40 or other locator formed on the sides of the cartridge 25.

Because the cartridge 25 is retained by the holder 27 when the case 10 is closed, it is very difficult to remove the cartridge 25 from the case 10 without opening the case. The theft resistance of the case 10 can be further enhanced by adding full-length walls to the front and back panels 11, 13 of the case 10, which overlap the opposite side when the case 10 is closed.

Figure 12:
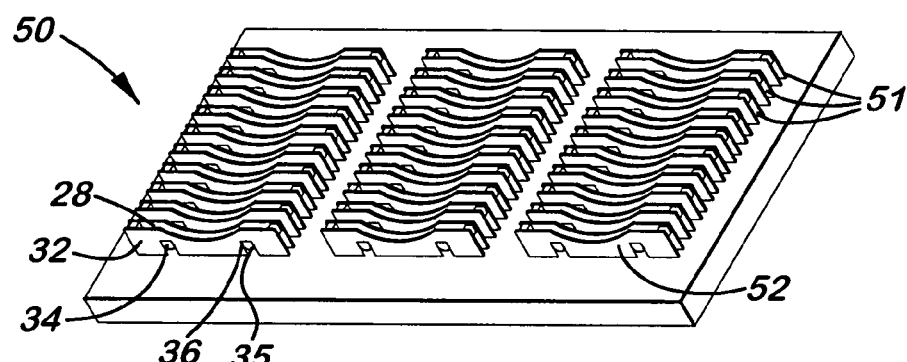
FIG. 12 is a perspective view of a tray having multiple disc cartridge holders for holding a plurality of disc cartridges, according to a second embodiment of the present invention.
Figure 13:
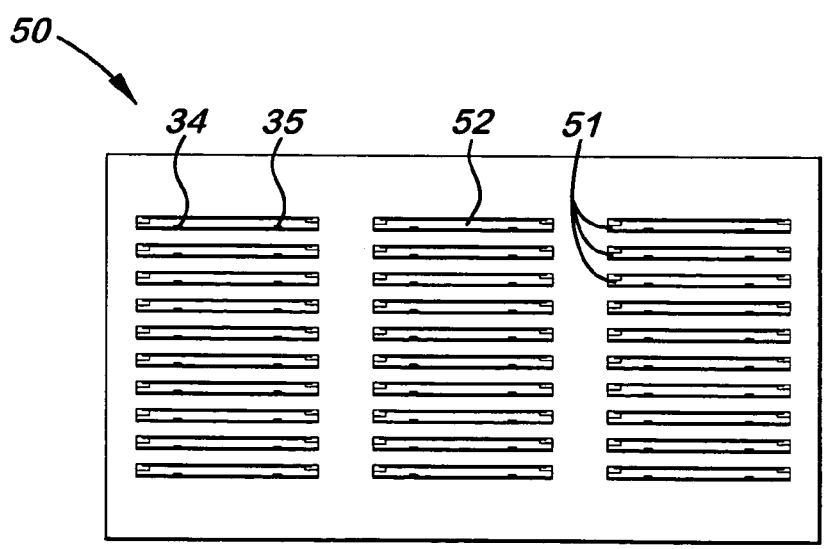
FIG. 13 is a plan view of the tray shown in FIG. 12.

A tray 50 having multiple disc cartridge presentation stands 51 for holding a plurality of disc cartridges, according to a second embodiment of the present invention, will now be explained with reference to FIGS. 12 and 13 of the drawings.

The tray 50 is formed by arranging multiple presentation stands 51 into a two-dimensional array of disc cartridge holders 52. The holders 52 can be fastened or glued into position, or they can be molded integrally with each other. The tray 50 can be used to safely and economically transport multiple disc cartridges in one carrier for use in manufacturing work-in-process movement or in industry distribution channels. The tray 50 could also be incorporated into a large case so that the end user could tote multiple cartridges more efficiently. The tray 50 could also be incorporated into a retail or sample product display.

Figure 14:
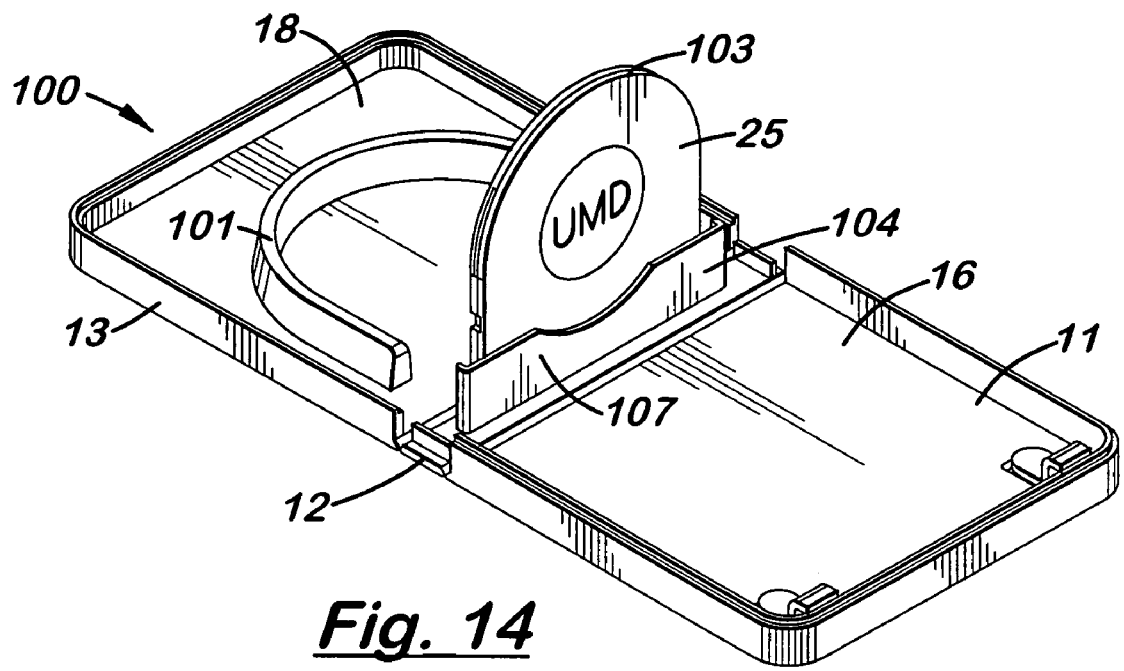
FIG. 14 is a perspective view of a disc cartridge storage case with the disc cartridge held therein according to a third embodiment of the present invention.
Figure 15:
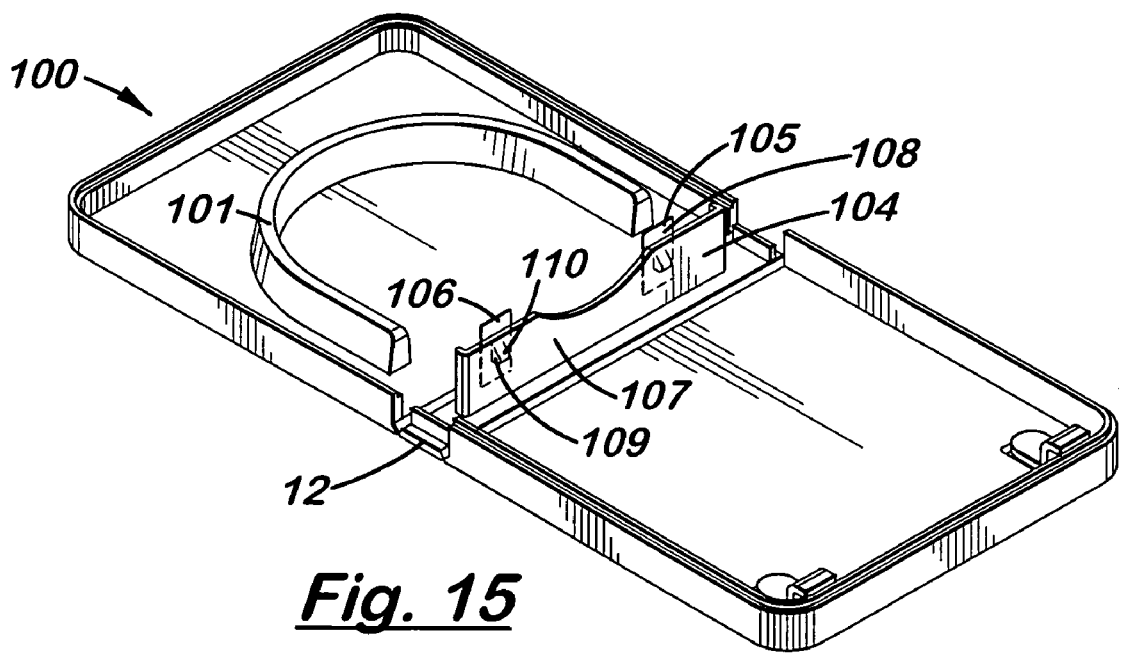
FIG. 15 is a perspective view of the disc cartridge storage case shown in FIG. 14 with the disc cartridge removed.

A disc cartridge storage case 100 according to a third embodiment of the present invention will now be explained with reference to FIGS. 14 and 15 of the drawings.

The storage case 100 has a construction similar to the storage case 10 described above. The various components of the storage case 100 having the same structure as the corresponding components of the storage case 10 are identified in FIGS. 14 and 15 using the same reference numerals, and further description thereof will be omitted.

A U-shaped rib 101 is molded into the back panel 13 of the case 100 and has an inner surface 102 corresponding in shape to the curved outer periphery 103 of the disc cartridge 25. The U-shaped rib 101 protrudes from the planar surface 18 of the back panel 13 toward the planar surface 16 of the front panel 11 when the storage case 100 is closed. The U-shaped rib 101 preferably extends a sufficient distance from the back panel 13 to completely envelope and protect the outer periphery 103 of the disc cartridge 25. The rib 101 functions to prevent the disc cartridge 25 from falling out or being pulled out of the presentation stand 104 when the storage case 100 is closed. The rib 101 also improves the theft resistance of the storage case 100 because it requires that the back panel 13 of the case 100 be pivoted relative to the middle panel 12 of the case 100 before the disc cartridge 25 can be removed from the presentation stand 104.

The presentation stand 104 of the storage case 100 is different than the presentation stand 27 of the storage case 10. The presentation stand 104 has first and second flexible supports 105, 106 protruding from the middle panel 12. The flexible supports 105, 106 are preferably molded integrally with the middle panel 12 and extend from the middle panel 12 in a cantilever fashion such that the flexible supports 105, 106 can be flexed toward and away from the rigid support 107. The rigid support 107 has substantially the same construction as the rigid support 31 of the presentation stand 27 of the storage case 10.

A receiving slot 108 is defined between each of the flexible supports 105, 106 and the rigid support 107 for receiving the disc cartridge 25. The flexible supports 105, 106 each have a projection 109 extending toward the rigid support 107. The projections 109 are positioned to correspond to the locations of the blind holes H1, H2 in the disc cartridge 25. The projections 109 have a beveled end 110 for facilitating insertion and alignment of the disc cartridge 25 within the receiving slot 108. When the disc cartridge 25 is fully inserted into the slot 108 of the presentation stand 104, the projections 109 of the flexible supports 105, 106 are resiliently held within the blind holes H1, H2 to hold the disc cartridge 25 firmly within the presentation stand 104. The flexible supports 105, 106 provide a firm engagement with the disc cartridge 25 for maintaining the disc cartridge 25 in its desired position against the rigid support 107, while allowing the disc cartridge 25 to be removed from and inserted into the presentation stand 104. The presentation stand 104 is arranged on the middle panel 12 closer to the back panel 13 so that the back panel 13 prevents the flexible supports 105, 106 from flexing outward and releasing the disc cartridge 25 when the case 100 is closed.

The preceding description has been presented only to illustrate and describe the invention. It is not intended to be exhaustive or to limit the invention to any precise form disclosed. Many modifications and variations are possible in light of the above teachings. For example, a clam-shell type storage case having more than one of the Applicants' presentation stands attached to the intermediate panel portion could be provided to create a multiple cartridge storage case.

The disclosed embodiments were chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims, which should be construed as broadly as the prior art will permit.

What is claimed is:

1. A disc cartridge storage case, comprising:
   a first cover portion;
   an intermediate portion connected to the first cover portion by a first hinge;
   a second cover portion connected to the intermediate portion by a second hinge, said first and second cover portions each being pivotable relative to the intermediate portion between respective open and closed positions; and
   said intermediate portion being provided with a holder for a disc cartridge, said holder having a slot, and said case having at least one projection extending into the slot for engaging a corresponding hole in a cartridge for holding the cartridge in the slot,
   wherein said holder comprises a first rigid support and a second flexible support, said slot is defined between facing surfaces of said first and second supports, and said at least one projection extends from said second flexible support and is flexible away from said first rigid support to allow a cartridge to be slipped into and out of the slot.

2. The disc cartridge storage case according to claim 1, wherein said at least one projection comprises first and second pins extending into the slot.

3. The disc cartridge storage case according to claim 1, wherein said at least one projection comprises first and second pins extending from said second flexible support into the slot.

4. The disc cartridge storage case according to claim 1, wherein said holder is arranged so that said second cover portion prevents the second flexible support of the holder from flexing outward when the second cover portion is in its closed position.

5. The disc cartridge storage case according to claim 4, wherein said holder is positioned on the intermediate portion closer to the second cover portion than to the first cover portion.

6. The disc cartridge storage case according to claim 1, wherein said holder is arranged so that said second cover portion prevents said at least one projection from moving outward from the slot when the second cover portion is in its closed position.

7. The disc cartridge storage case according to claim 1, wherein said at least one projection has a beveled end to facilitate insertion and removal of a cartridge from the slot.

8. The disc cartridge storage case according to claim 1, wherein outer surfaces of said first and second cover portions and said intermediate portion are substantially coplanar with each other when said first and second cover portions are in their open positions, and said holder extends from said intermediate portion such that said slot opens in a direction perpendicular to a plane containing said first and second cover portions in their open positions.

9. The disc cartridge storage case according to claim 1, wherein said holder further comprises at least one hole arranged to be aligned with a corresponding hole in a disc cartridge when the cartridge is seated in the slot of the holder, and wherein said at least one projection comprises at least one pin extending from the second cover portion, said at least one pin being aligned with said at least one hole of the holder as the second cover portion moves into its closed position to protrude through said at least one hole of the holder and into the corresponding hole of the disc cartridge.

10. The disc cartridge storage case according to claim 1, wherein said first cover portion includes a means for displaying printed graphics and instructional material.

11. The disc cartridge storage case according to claim 1, wherein said first and second cover portions and said intermediate portion comprise the front, back and middle panels, respectively, of a clam-shell type case made of polypropylene.

12. The disc cartridge storage case according to claim 1, wherein said holder is arranged to support a disc cartridge perpendicular to an outer planar surface of said intermediate portion.

13. The disc cartridge storage case according to claim 1, wherein said said second flexible support is located on one side of said slot, and said at least one projection extends from said second flexible support and is movable away from a position of equilibrium to allow a cartridge to be slipped into and out of the slot when the case is opened.

14. The disc cartridge storage case according to claim 1, wherein said holder further comprises another flexible support to form a pair of flexible supports extending in a cantilever fashion from the intermediate portion, said slot is defined between facing surfaces of said rigid support and said flexible supports, and said at least one projection comprises a pair of projections extending from the flexible supports into said slot for engaging corresponding holes in the cartridge.

15. The disc cartridge storage case according to claim 1, further comprising a U-shaped rib formed integral with and projecting from an inner planar surface of the second cover portion toward an inner planar surface of the first cover portion, said U-shaped rib having an inner periphery that corresponds closely with an arcuate outer periphery of a disc cartridge to be held within said case.

16. A disc cartridge presentation stand, comprising:
a holder for holding a cartridge, said holder having a slot into which said cartridge can be inserted, and at least one projection extending resiliently into the slot for engaging a corresponding recess in the cartridge for holding the cartridge within the slot, wherein said holder comprises a first rigid support and a second flexible support, said slot is defined between facing surfaces of said first and second supports, and said at least one projection extends from said flexible support and is flexible away from said first rigid support to allow a cartridge to be slipped into and out of the slot.

17. The disc cartridge presentation stand according to claim 16, wherein said at least one projection comprises first and second pins extending into the slot, said pins being resiliently movable in a direction perpendicular to a direction of insertion of the disc cartridge into said slot.

18. The disc cartridge presentation stand according to claim 16, wherein said at least one projection has a beveled end to facilitate insertion and removal of a cartridge from the slot.

19. The disc cartridge presentation stand according to claim 16, wherein said holder is attached to a middle panel of a clam-shell type storage case.

20. A disc cartridge storage case, comprising:
a first cover portion;
an intermediate portion connected to the first cover portion by a first hinge;
a second cover portion connected to the intermediate portion by a second hinge, said first and second cover portions each being pivotable relative to the intermediate portion between respective open and closed positions; and
said intermediate portion being provided with a holder for a disc cartridge, said holder having a slot, and said case having at least one projection extending into the slot for engaging a corresponding hole in a cartridge for holding the cartridge in the slot, wherein said holder further comprises at least one hole arranged to be aligned with a corresponding hole in a disc cartridge when the cartridge is seated in the slot of the holder, and wherein said at least one projection comprises at least one pin extending from the second cover portion, said at least one pin being aligned with said at least one hole of the holder as the second cover portion moves into its closed position to protrude through said at least one hole of the holder and into the corresponding hole of the disc cartridge.

21. The disc cartridge storage case according to claim 20, wherein said at least one projection comprises first and second pins extending into the slot.

22. The disc cartridge storage case according to claim 20, wherein said holder comprises a first rigid support and a second flexible support, said slot is defined between facing surfaces of said first and second supports, and said at least one projection extends from said second flexible support and is flexible away from said first rigid support to allow a cartridge to be slipped into and out of the slot.

23. The disc cartridge storage case according to claim 22, wherein said at least one projection comprises first and second pins extending from said second flexible support into the slot.

24. The disc cartridge storage case according to claim 22, wherein said holder is arranged so that said second cover portion prevents the second flexible support of the holder from flexing outward when the second cover portion is in its closed position.

25. The disc cartridge storage case according to claim 24, wherein said holder is positioned on the intermediate portion closer to the second cover portion than to the first cover portion.

26. The disc cartridge storage case according to claim 20, wherein said holder is arranged so that said second cover portion prevents said at least one projection from moving outward from the slot when the second cover portion is in its closed position.

27. The disc cartridge storage case according to claim 20, wherein said at least one projection has a beveled end to facilitate insertion and removal of a cartridge from the slot.

28. The disc cartridge storage case according to claim 20, wherein outer surfaces of said first and second cover portions and said intermediate portion are substantially coplanar with each other when said first and second cover portions are in their open positions, and said holder extends from said intermediate portion such that said slot opens in a direction perpendicular to a plane containing said first and second cover portions in their open positions.

29. The disc cartridge storage case according to claim 20, wherein said first cover portion includes a means for displaying printed graphics and instructional material.

30. The disc cartridge storage case according to claim 20, wherein said first and second cover portions and said intermediate portion comprise the front, back and middle panels, respectively, of a clam-shell type case made of polypropylene.

31. The disc cartridge storage case according to claim 20, wherein said holder is arranged to support a disc cartridge perpendicular to an outer planar surface of said intermediate portion.

32. The disc cartridge storage case according to claim 20, wherein said holder comprises a flexible support on one side of said slot, and said at least one projection extends from said flexible support and is movable away from a position of equilibrium to allow a cartridge to be slipped into and out of the slot when the case is opened.

* * * * *

UNITED STATES PATENT AND TRADEMARK OFFICE
CERTIFICATE OF CORRECTION

| | | |
|---|---|---|
| PATENT NO. | : 7,191,899 B2 | Page 1 of 1 |
| APPLICATION NO. | : 10/813044 | |
| DATED | : March 20, 2007 | |
| INVENTOR(S) | : Jose Pascual Garcia, Jr. et al. | |

It is certified that error appears in the above-identified patent and that said Letters Patent is hereby corrected as shown below:

<u>Title Page, Item (60):</u>
"filed on Dec. 15, 2003" should read -- filed on Dec. 16, 2003 --.

Signed and Sealed this

Tenth Day of July, 2007

JON W. DUDAS
*Director of the United States Patent and Trademark Office*